Dec. 20, 1927.
J. E. McCULLOCH
AIRCRAFT
1,653,056
Filed Nov. 17, 1926    3 Sheets-Sheet 1
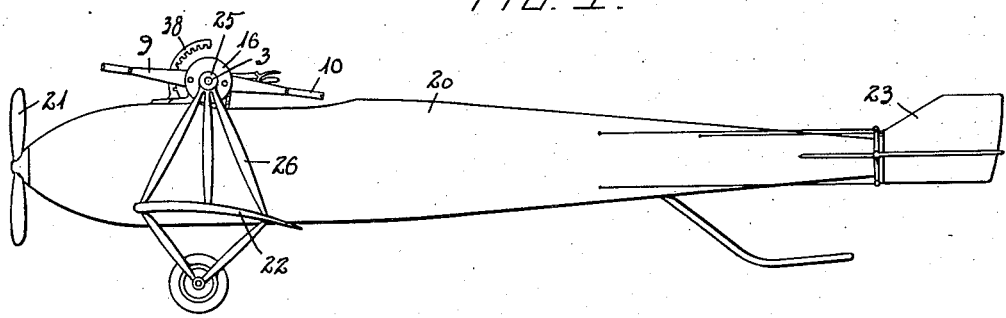
FIG. 1.
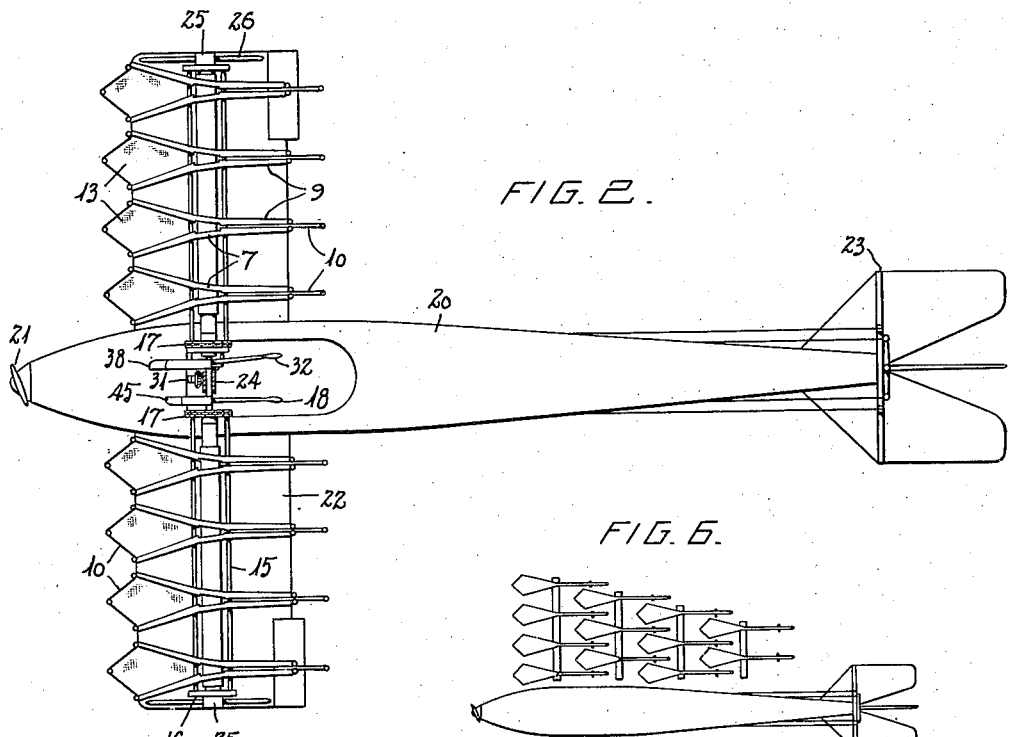
FIG. 2.
FIG. 6.
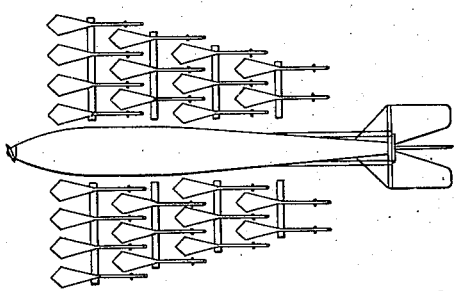
Inventor:
J. E. McCulloch
By Monroe E. Miller
Attorney.

Dec. 20, 1927. 1,653,056
J. E. McCULLOCH
AIRCRAFT
Filed Nov. 17, 1926 3 Sheets-Sheet 2

Inventor:
J. E. McCulloch
By Monroe E. Miller
Attorney.

Dec. 20, 1927.   1,653,056
J. E. McCULLOCH
AIRCRAFT
Filed Nov. 17, 1926   3 Sheets-Sheet 3

Inventor:
J. E. McCulloch
By Monroe E. Miller
Attorney.

Patented Dec. 20, 1927.

1,653,056

UNITED STATES PATENT OFFICE.

JAMES E. McCULLOCH, OF KENSINGTON, MARYLAND.

AIRCRAFT.

Application filed November 17, 1926. Serial No. 148,871.

The present invention relates to propelling devices for airplanes and other airships, and aims to provide rotary wings of novel and improved construction that will be efficient and practical for obtaining ascending, descending, propulsion, braking and steering forces in the air.

Another object of the invention is the provision of rotary wings for airships comprising a novel construction and assembly of the component elements to enhance the utility and efficiency of the airship.

A further object is to incorporate the rotary wings in an airplane or other airship and to provide means for controlling the wings in order that the wings may not only facilitate ascent, descent, flight and steering of the airship, but may also be utilized as airplanes or wings, when positioned at an angle of incidence to the line of flight, in order to assist in sustaining the airship in the air.

A still further object is to utilize the rotary wings for braking action in order to retard the airship, to avoid collisions while in flight or when making a landing.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of an airplane embodying the improvements.

Fig. 2 is a plan view thereof.

Fig. 6 is a diagrammatical plan view illustrating a modification in the use of the wings on an airplane.

Figures 3, 4, 5:
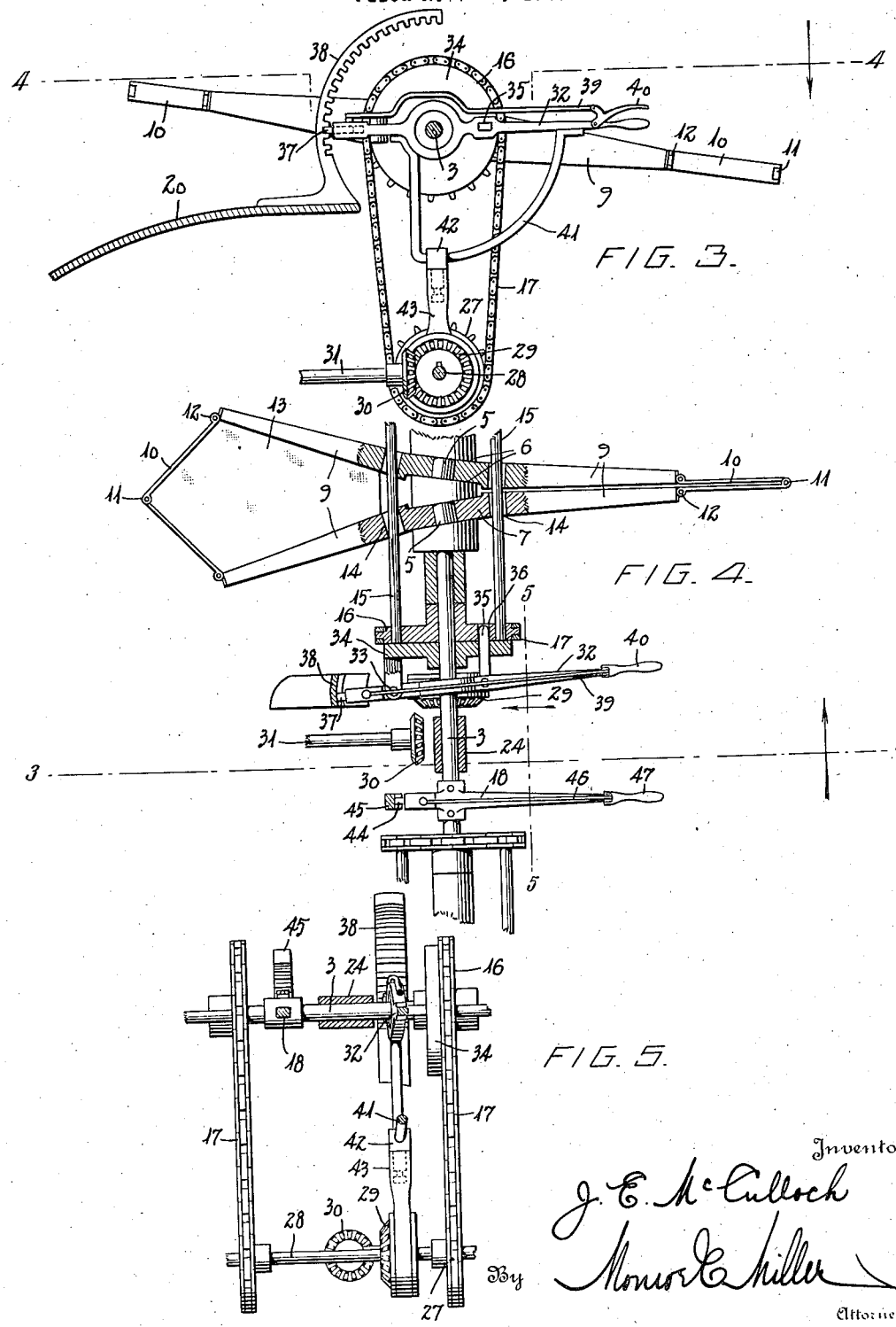
Fig. 3 is an enlarged detail view taken on the line 3—3 of Fig. 4.
Fig. 4 is a detail view taken on the line 4—4 of Fig. 3.
Fig. 5 is a detail view taken on the line 5—5 of Fig. 4.

The rotary wing may consist in any number of units, and the units of each set or group are mounted on a shaft 3 which is suitably supported by the frame of the airplane or other airship. The shaft 3 will usually be in a horizontal position transversely of the airship, although in some instances said shaft may be located in other positions according to the uses to which the device may be put. The shaft 3 has pairs of reversely oblique journal portions 5, one pair for each rotary wing unit, and said shaft has shoulders 6 adjacent to said portions 5 perpendicular therewith. Bars 7 are mounted for rotation on the journal portions 5 between the shoulders 6, and said bars are arranged in pairs and have the arms 9 extending in diametrically opposite directions from the shaft. The arms 9 of each bar are arranged at an obtuse angle with one another, in order that said arms are moved together and apart at the opposite sides of the shaft 3, as seen in Figs. 2 and 4. Toggle links 10 having hinge joints 11 are hingedly connected, as at 12, to the ends of the arms 9 and provide with said arms foldable frames in which the flexible webs 13 are secured. Said webs are of fabric, leather or other suitable pliant material, and the webs are secured to the arms and links 10 in any suitable manner.

In order to rotate the rotary wing units of each set or group, the arms 9 are provided adjacent to the shaft 3 with apertures 14 through which longitudinal rods 15 extend. As shown in Figs. 1, 2, 3 and 4, the wing units are all arranged in the same plane. The rods 15 are parallel with the shaft 3 and the terminals thereof are secured to wheels 16 mounted for rotation on the shaft.

As shown in Figs. 1-4 there are two sets or groups of wing units on a common shaft 3, and the inner wheels 16 are sprocket wheels for the engagement of endless sprocket chains 17 for delivering power to the rotary wings, thereby causing the arms 9 to rotate with the rods 15.

The shaft 3 may be turned in order to change the positions around the axis of the shaft 3 where the arms 9 are separated the maximum amount, and for this purpose a hand lever 18 is secured to the shaft 3.

In the embodiment of the invention as shown in Figs. 1 to 5, inclusive, the rotary wings are applied to an airplane. The shaft 3 extends transversely across the fuselage or body 20 and has a set of wing units at each side of said fuselage, corresponding with the upper wings of a biplane. The airplane has the usual propeller 21 at its forward end, and has the lower wings or planes 22 above which the rotary wings are mounted, and the fuselage 20 has the usual rudders 23 at its rear end. A bearing 24 carried by the fuselage 20 supports the intermediate of the shaft 3, and the extremities of said shaft are journaled in bearings 25 connected by struts 26 with the wings 22, in order to provide a rigid construction.

In order to drive the rotary wings the sprocket chains 17 extend around sprocket wheels 27 on a transverse shaft 28 mounted in the fuselage 20 below the shaft 3, and a bevel gear 29 is feathered on the shaft 28 to mesh with a bevel gear 30 on the drive shaft 31 which is driven by the engine (not shown), or any suitable clutch connection may be employed for making and braking the connection between the drive shaft and rotary wings.

Manually controlled means is provided for positioning the wings at desired angles relatively to the longitudinal line of the fuselage 20. For this purpose a hand lever 32 is fulcrumed, as at 33, to a disk or member 34 mounted for rotation on the shaft 3 adjacent to one wheel 16, and a latch bolt 35 is pivoted to the lever 32 and is slidable through the member 34 to be projected into and retracted from an aperture or socket 36 in said wheel 16 by swinging the lever 32 longitudinally of the shaft 3, and it will be noted that the lever 32 may also be turned around the axis of the shaft 3 with the member 34. As shown, the lever 32 extends rearwardly for convenient control by the pilot, and the forward end of the lever carries a dog 37 to engage a rack or segment 38 for holding the lever 32 in different angular positions around the axis of the shaft 3. The dog 37 is connected by a rod or link 39 with a hand grip 40 pivoted to the lever 32 adjacent to the handle thereof, in order that when the lever is grasped, the dog 37 is retracted from the segment 38, to permit the lever to be swung upwardly and downwardly. The segment 38 is of arcuate cross-section to permit the lever 32 to swing longitudinally of the shaft 3 for sliding the latch bolt 35. The lever 32 also controls the bevel gear 29 to bring it into and out of mesh with the bevel gear 30. Thus, a rod 41 secured to said lever 32 and curved around the axis of the shaft 3 passes slidably through a swivel member 42 swivelled within a member 43 embracing the bevel gear 29. Thus, when the lever 32 is swung longitudinally of the shaft 3 the rod 41 will slide the member 43 longitudinally to shift the gear 29 into or out of engagement with the gear 30. The rod 41 sliding in the swivel member 42 will permit the lever 32 to be swung upwardly and downwardly and in any position of said lever 32 around the axis of the shaft 3 said lever may be swung longitudinally of the shaft 3.

The lever 18 has a dog 44 to engage a rack or segment 45 for holding the shaft 3 in different positions to which it is turned by the lever 18, and the dog 44 is connected by a rod or link 46 with a hand grip 47 pivoted to the lever 18 adjacent to the handle thereof, so that when the lever 18 is grasped the dog 44 is retracted to permit said lever to be swung. The lever 18, similar to the lever 32, extends rearwardly to be conveniently operated by the pilot.

In operation, the rotary wings may be operated and controlled for different conditions that arise. The rotary wings will facilitate the rising of the airplane or other airship from the ground, either vertically or with a gliding start. This is accomplished by swinging the lever 32 so as to withdraw the latch bolt 35 from the aperture 36 and to connect the gear 29 with the drive shaft 31 so that the rotary wings are actuated. The lever 18 is then adjusted so as to turn the shaft 3 to a position for causing the arms 9 to swing apart when in front of the shaft 3 and moving downwardly, the wings being rotated counter-clockwise as seen in Figs. 1 and 3. The webs 13 are thus opened as they move downwardly in front of the shaft 3, so that said webs beat downwardly against the air, and the arms 9 are swung together where they move upwardly in rear of the shaft 3, thereby folding the webs in order to offer the least amount of resistance when moving upwardly. The toggle links 10 are also folded together with the arms 9 when the arms are swung together, and said links are swung apart with the arms 9 so as to open out or unfold the outer portions of the webs 13. This action of the rotary wings will enable the airship to rise vertically, and this operation may also be taken advantage of to facilitate rising off the ground when taking off in an airplane in the usual manner. Such action of the rotary wings may also be employed for sustaining the airplane or other airship in the air against gravity, and by slowing down the wings the airship may be permitted to settle down to the ground without the necessity of gliding to the earth. By turning the shaft 3 so that the wings open up below the shaft 3 said wings will exert a propulsion force to move the airship forwardly, and by turning the shaft 3 so that the wings open up above the shaft 3, the wings will exert a braking action to retard or stop the airship. It is thus possible, by turning the shaft 3, to cause the webs 13 to be opened up or unfolded at different points around the axis of said shaft, for exerting the force in different directions. It is also possible to control the rotary wings in order to facilitate steering the airship.

The rotary wings are also capable of acting as airplane wings or planes, for example, in the construction shown to supplement the wings or planes 22 for sustaining the airplane while in flight. This is accomplished by swinging the lever 32 so as to release the rotary wings from the drive shaft 31, and to project the latch bolt 35 into the aperture 36, thereby locking the rotary wings to the hand lever 32. By releasing said hand lever from the segment 38 the hand lever may then be turned around the shaft 3 for positioning the arms 9 at the desired angle of incidence to the line of flight, as seen in Figs. 1 and 3, and the dog 37 engaging the segment 38 will hold the arms 9 in the position to which they have been turned. The lever 18 is adjusted so that the forward webs 13 are open and they will provide wings or planes to assist in sustaining the airship in flight. The angle of the arms 9 may be changed to increase or decrease the angle of incidence, and the arms may even be turned toward a vertical position so as to act as a brake for retarding the airship to avoid collision when in flight or when making a landing.

The rotary wings may thus be used on both heavier- and lighter-than-air airships for obtaining ascending, propulsion, descending and retarding or braking forces, and may be used on lighter-than-air airships for obtaining a backing action. The rotary wings are also convertible into stationary planes or wings to serve as airplane wings or planes.

The rotary wing construction is simple and will operate smoothly and with a least amount of resistance and vibration, and suitable anti-frictional bearings may be used between the shaft 3 and bars 7.

Fig. 6 illustrates longitudinally spaced transverse series or sets of rotary wings distributed along the length of the fuselage or body of the airplane in order to obtain greater lifting force and to distribute the force lengthwise of the airship, it being noted that the units are in staggered relation so that the arms 9 are adapted to overlap and pass one another, in a compact arrangement.

Figure 7:
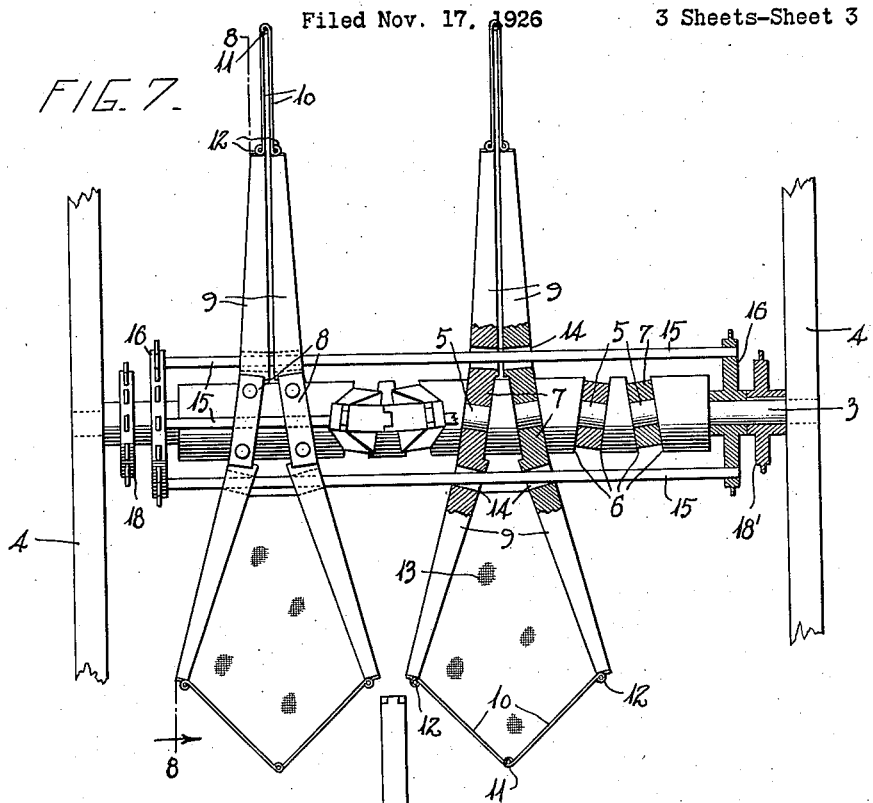
Fig. 7 is a plan view of another modification.
Figure 8:
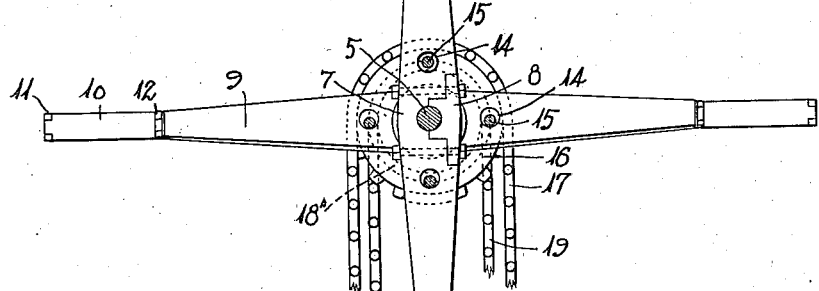
Fig. 8 is a section on the line 8—8 of Fig. 7.

Figs. 7 and 8 illustrate four units of a rotary wing device, with the arms 9 arranged at right angles to one another, as seen in Fig. 8. This construction is especially intended for use in lighter-than-air airships, and the arms 9 may be arranged at different angles relatively to one another, and a corresponding number of rods 15 are employed. The shaft 3 is shown as mounted in a frame 4, and the wheels 16 are both sprocket wheels, and the wheels 18' are secured on the shaft 3 and have sprocket chains 19 thereon for changing the angular position of the shaft 3.

Having thus described the invention, what is claimed as new:—

1. A rotary airship wing comprising a shaft having reversely-oblique journal portions, members mounted for rotation on said portions and having arms to be moved together and apart when said members rotate around said portions, hingedly connected links hingedly connected to the ends of said arms, and webs connected to said arms and links.

2. A rotary airship wing comprising members having arms, means mounting said members for rotation to move the arms together and apart during the rotation of said members, hingedly connected links hingedly connected to the ends of said arms, and webs connected to said arms and links.

3. A rotary airship wing comprising a shaft, members mounted for rotation on said shaft and having arms movable together and apart, webs carried by said arms to be folded and unfolded therewith, and driving means rotatable on said shaft having longitudinal rods engaging said arms to rotate said members with said rods.

4. A rotary airship wing comprising a shaft having reversely-oblique journal portions, members rotatable on said portions and having arms to be moved together and apart, webs connected to said arms to be folded and unfolded therewith, wheels rotatable on said shaft, and longitudinal rods connected with said wheels, said arms having apertures through which said rods extend.

5. In an aircraft, members rotatable around a transverse axis and adapted to be folded and unfolded at opposite sides of said axis, means for rotating said members, and means for locking said members against rotation and for changing the angle of the unfolded portions thereof.

6. In an aircraft, a transverse shaft, members rotatable around said shaft, said members and shaft having cooperable portions for folding and unfolding said members at opposite sides of the shaft, means for rotating said members around said shaft, means for turning said shaft, and means for locking said members to said shaft and for changing the angle of said shaft.

7. In an aircraft, members rotatable around a transverse axis and adapted to be unfolded and folded at opposite sides of said axis, means for rotating said members, and means for locking said members against rotation with the unfolded portions thereof arranged at an angle of incidence to the line of flight.

8. In an aircraft, a transverse shaft, members rotatable around said shaft, said members and shaft having cooperable portions for folding and unfolding said members at opposite sides of said shaft, means for turning said shaft to control the positions where said members fold and unfold, means for rotating said members on said shaft, and means for holding said members against rotation with the unfolded portions thereof arranged at the angle of incidence to the line of flight.

In testimony whereof I hereunto affix my signature.

JAMES E. McCULLOCH.